United States Patent [19]

Yamamoto et al.

[11] Patent Number: 5,042,436

[45] Date of Patent: Aug. 27, 1991

[54] VALVE CONTROL SYSTEM FOR INTERNAL COMBUSTION ENGINES

[75] Inventors: Osamu Yamamoto; Masakazu Sakaguchi, both of Wako, Japan

[73] Assignee: Honda Giken Kogyo Kabushiki Kaisha, Tokyo, Japan

[21] Appl. No.: 511,081

[22] Filed: Apr. 19, 1990

[30] Foreign Application Priority Data

Apr. 19, 1989 [JP] Japan .................................. 1-99643
Apr. 19, 1989 [JP] Japan .................................. 1-99644
Apr. 19, 1989 [JP] Japan .................................. 1-99645

[51] Int. Cl.$^5$ .......................................... B60K 28/16
[52] U.S. Cl. .............................. 123/90.15; 123/90.16; 180/197
[58] Field of Search ............... 123/90.15, 90.16, 90.17; 180/197

[56] References Cited

U.S. PATENT DOCUMENTS

| 4,800,850 | 1/1989 | Yoshida et al. | 123/90.16 |
| 4,883,027 | 11/1989 | Oikawa et al. | 123/90.16 |
| 4,921,064 | 5/1990 | Wazaki et al. | 180/197 |
| 4,959,794 | 9/1990 | Shiraishi et al. | 180/197 |
| 4,969,102 | 11/1990 | Tamura et al. | 180/197 |
| 4,971,164 | 11/1990 | Fujita et al. | 180/197 |

FOREIGN PATENT DOCUMENTS

| 51-48334 | 12/1976 | Japan . | |
| 58-8436 | 1/1983 | Japan . | |
| 0215430 | 9/1988 | Japan | 180/197 |

*Primary Examiner*—Willis R. Wolfe
*Assistant Examiner*—Weilun Lo
*Attorney, Agent, or Firm*—Lyon & Lyon

[57] ABSTRACT

The valve lift characteristic of inlet and/or exhaust valves of an internal combustion engine is changed when an excessive slip state of at least one driving wheel of the vehicle is detected. Restoration of the changed valve lift characteristic is inhibited when a specific running condition of the vehicle is detected, or when turning of the vehicle is detected. According to other aspects of the invention, a predetermined valve lift characteristic-changing control manner is changed in response to a detected road surface condition, or in response to detected turning of the vehicle. According to another aspect of the invention, a feedback control amount is calculated based upon a difference between a detected driving wheel speed and a detected vehicle speed, and at least one predetermined gain. The output torque of the driving wheels is reduced in response to the calculated feedback control amount. The valve lift characteristic is changed when the calculated feedback control amount indicates an excessive slip state of the driving wheel(s), and the value of the gain is changed when the valve lift characteristic is changed.

13 Claims, 12 Drawing Sheets

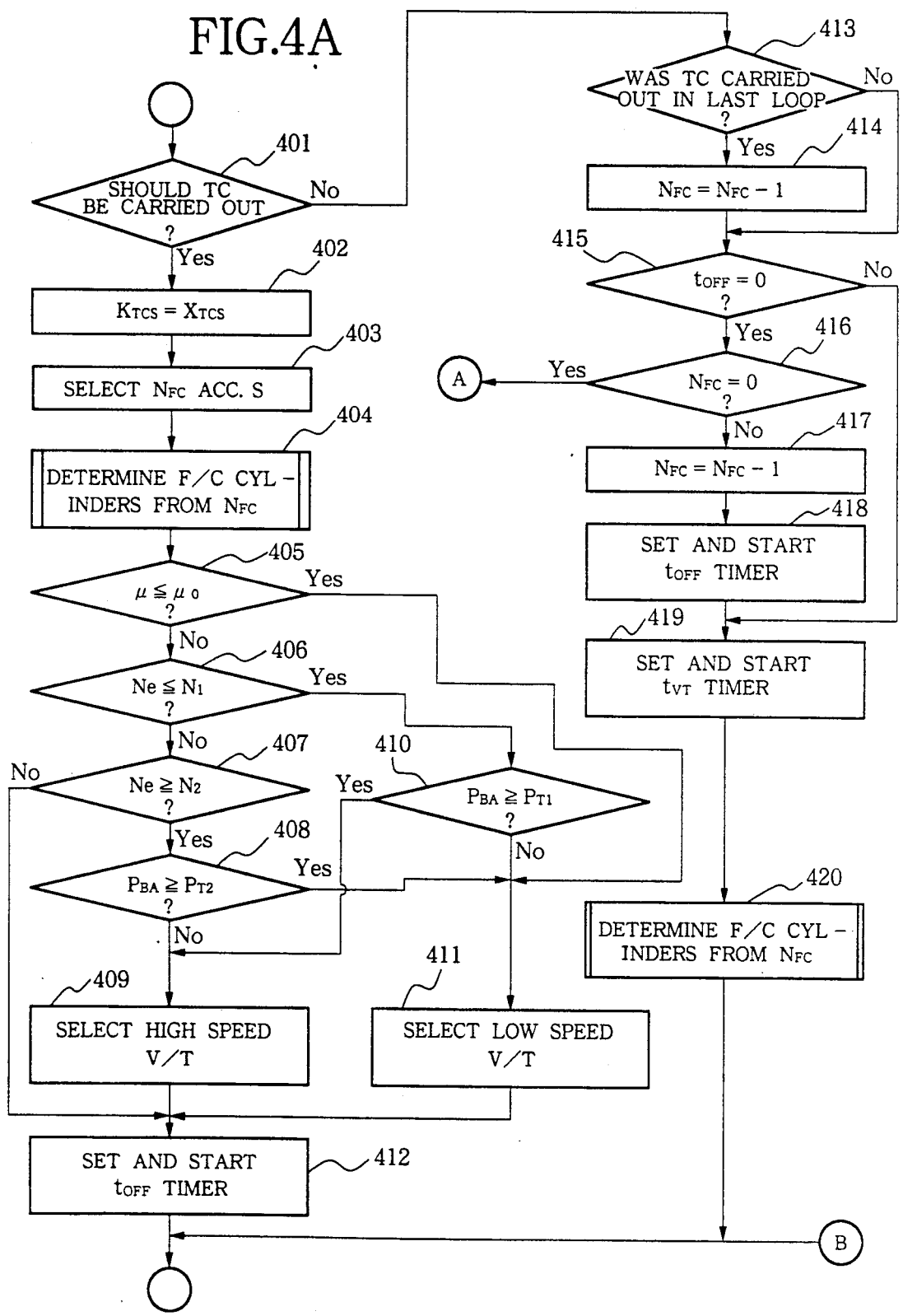

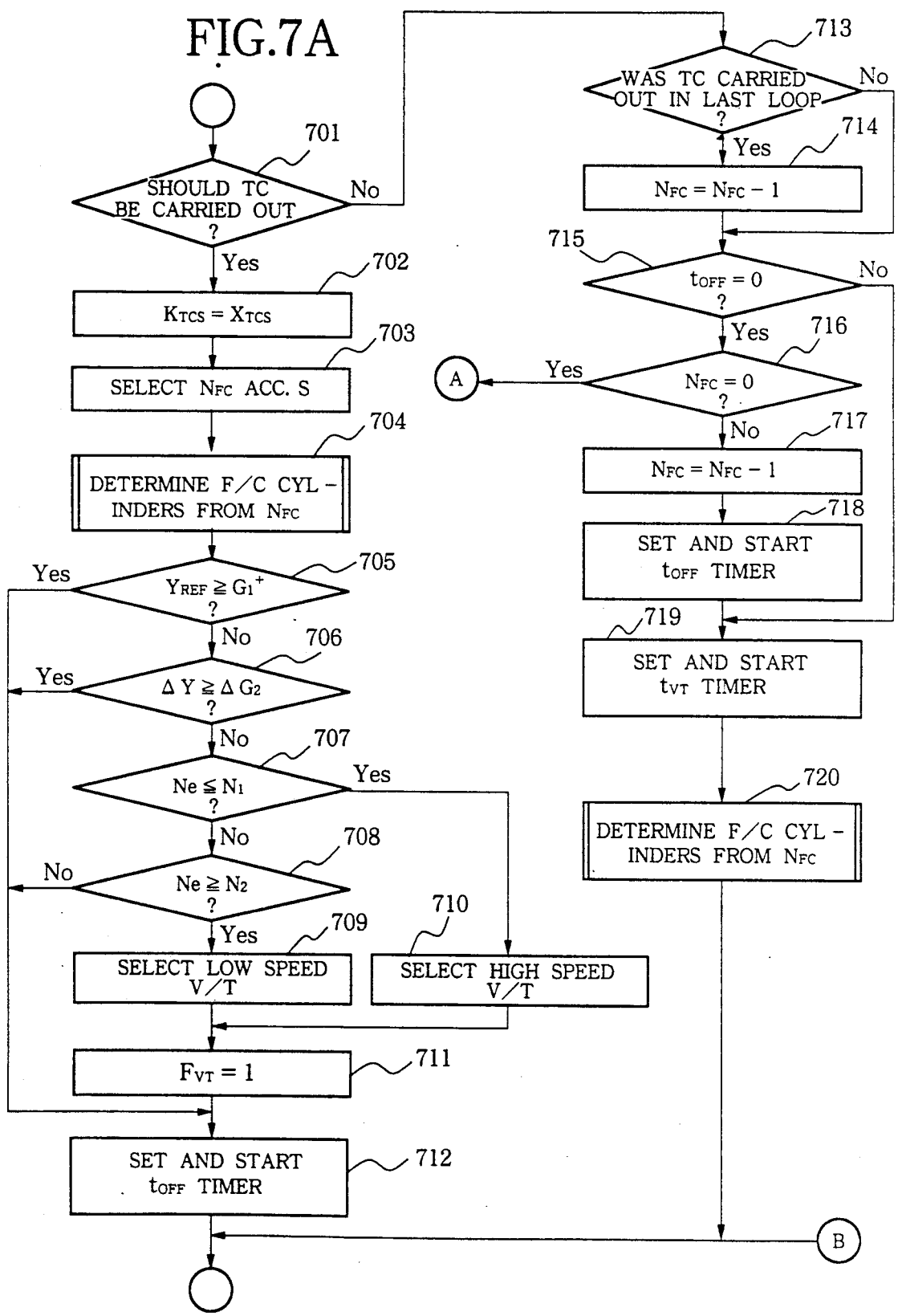

VALVE CONTROL SYSTEM FOR INTERNAL COMBUSTION ENGINES

BACKGROUND OF THE INVENTION

This invention relates to a valve control system for internal combustion engines which are capable of changing the valve lift characteristic of inlet and/or exhaust valves, and more particularly to a valve control system of this kind for automotive vehicles equipped with driving wheel slip control systems.

There is shown in FIG. 10 the general relationship between the engine rotational speed and the engine output torque in an internal combustion engine which is capable of switching the valve lift characteristic of inlet and/or exhaust valves between a low speed valve lift characteristic suitable for a lower engine rotational speed region and a high speed valve lift characteristic suitable for a higher engine rotational speed region. (Throughout the specification and claims, the term "valve lift characteristic" represents a valve opening period of an inlet and/or exhaust valve and/or an amount of lift of the inlet and/or exhaust valve.) In the lower engine rotational speed region, larger engine output torque can be obtained when the low speed valve lift characteristic is selected, while in the higher engine rotational speed region, larger engine output torque can be obtained when the high speed valve lift characterisitic is selected. Normally, the valve lift characteristic which enables to obtain larger engine output torque is selected depending upon engine operating conditions (mainly upon the engine rotational speed). Therefore, if the valve lift characteristic is changed to one which is opposite to a normally-selected valve lift characteristic, the engine output torque can be decreased.

This feature of selection of the valve lift characteristic is utilized, e.g. in Japanese Patent Application No. 63-330938 filed by the present assignee. This application proposes a valve control system in which the degree of slip of driving wheels is reduced by changing the valve lift characteristic to one which enables to obtain smaller engine output torque when an excessive slip state of the driving wheels is detected.

The above proposed valve control system is effective in suppressing excessive slip of the driving wheels, since the engine output can be effectively decreased by the changeover of the valve lift characteristic. However, there is a possibility that on a road surface having a relatively low friction coefficient, i.e. on a slippery road surface, the changeover of the valve lift characteristic is frequently carried out, which can shorten the life of the valve lift characteristic-switching mechanism.

Further, when the valve lift characteristic is changed over, the engine output torque can be drastically changed. Particularly, when the valve lift characteristic is restored to a normal one which enables to obtain larger engine output torque after suppressing excessive slip of driving wheels, there is a great possibility that the engine output torque increases to bring about an excessive slip state of the driving wheels again, which degrades the controllability (driveability) of the vehicle.

In the meanwile, it is conventionally known e.g. from Japanese Provisional Patent Publication (Kokai) No. 58-8436 to control the slip state of driving wheels by reducing the engine output through cutting off fuel supply (fuel cut) or leaning the mixture to the engine when an excessive slip state of the driving wheels is detected.

However, in general, the engine output can be reduced more responsively by fuel cut or mixture-leaning than by changing the valve lift characteristic, which leads to the following disadvantage when the two kinds of manners for reducing the engine output are used in combination:

Although when an excessive slip state of the driving wheels is detected, the valve lift characteristic is changed to one which enables to obtain a smaller engine output, an enging output-reducing effect is obtained in a relatively short period of time due to the fuel cut or mixture-leaning to eliminate the excessive slip state of the driving wheels, so that the valve lift characteristic is restored to a normal one which enables to obtain a greater engine output in a short period of time. This restoration of the valve lift characteristic to the normal one results in an increase in the engine output, and therefore can bring about an excessive slip state again, which causes changeover of the valve lift characteristic again. Thus, hunting of the valve lift characteristic can occur, particularly when the vehicle continues to run on a road surface which is low in friction coefficient, i.e. on a slippery road surface. This degrades the controllability (driveability) of the vehicle and can even shorten the life of the valve lift characteristic-changing mechanism.

Further, according to the proposed valve control system, when the valve lift characteristic is changed over, the engine output can drastically change. If the engine output drastically changes on a road surface having a low friction coefficient, which is liable to bring about an excessive slip state of the driving wheels, there can occur a drastic change in the slip state of the driving wheels, and further a sudden change in the distribution of the wheel load. Therefore, changeover of the valve lift characteristic on such an occasion can result in degraded controllability of turning of the vehicle.

In the meanwhile, as recognized in general, a driving wheel of an automotive vehicle undergoes a slip when the vehicle is started to run or when it is accelerated, if the driving force of the driving wheel surpasses a frictional force developed between the tire of the driving wheel and the road surface [=the coefficient of friction between the tire and the road surface × load of the vehicle weight on the driving wheel (wheel load)]. Conventionally, a driving wheel slip control system has been proposed, e.g. by Japanese Patent Publication (Kokoku) No. 51-48334, in which the degree of the slip is detected from a difference $\Delta V$ between the driving wheel speed and the trailing wheel speed, and a feedback control amount is calculated based on the detected wheel speed difference $\Delta V$ and a predetermined control gain, so that the output torque of the driving wheels is reduced in accordance with the feedback control amount. The reduction of the output torque of the driving wheels in accordance with the feedback control amount is carried out by fuel cut/leaning of the mixture, or by changing ignition timing.

If the valve lift characteristic is changed to one enabling to obtain a smaller engine output by the proposed valve control system when an excessive slip state of the driving wheels is detected, so as to eliminate the excessive slip state, the manner of change in the engine output (particularly the increase rate of the engine output) varies. More specifically, when the valve lift characteristic is changed to one enabling to obtain a smaller engine output, the engine output is once reduced upon the changeover. If the excessive slip state of the driving wheels is not eliminated by this reduction of the engine output, excessive slip control is continued by holding the valve lift characteristic at the one enabling to obtain a smaller engine output. Therefore, the engine output changes in a manner different from that in the case where a normal valve lift characteristic enabling to obtain a larger engine output is selected.

In the meanwhile, in the above conventional driving wheel slip control system, the control gain for calculating the feedback control amount is set to a valve suitable for eliminating an excessive slip state of the driving wheels in a short time period, by taking into consideration the time lag in the control system from the time point the excessive slip state is detected to the time point reduction of the engine output by fuel cut etc. actually takes effect while a normal valve lift characteristic is selected. However, if this feedback control is employed in combination with the above-mentioned valve lift characteristic-changing control to reduce the engine output for elimination of an excessive slip state of the driving wheels, the manner of change in the engine output is varied by changeover of the valve lift characteristic to the one enabling to obtain a smaller engine output carried out when the excessive slip state is detected, whereby the above time lag varies. Consequently, if the same control gain is used for the feedback control irrespective of change in the valve lift characteristic, the excessive slip state cannot be eliminated or it can take much time to eliminate the excessive slip state due to the variation in the time lag caused by changeover of the valve lift characteristic. Therefore, in the case where the conventional driving wheel slip control system is applied to a vehicle in which is installed an engine capable of changing the valve lift characteristic, and at the same time the valve lift characteristic is changed to one enabling to obtain a smaller engine output when an excessive slip state of the driving wheels is detected, the excessive slip control has to be improved, especially so as to compensate for the varied increase rate of the engine output caused by changeover of the valve lift characteristic.

SUMMARY OF THE INVENTION

It is an object of the invention to provide a valve control system for an internal combustion engine, which is capable of changing the valve lift characteristic for control of the excessive slip of driving wheels, in a manner reducing the frequency of changeover of the valve lift characteristic so that the valve lift characteristic-changing mechanism may have a longer life, while preventing degradation in the controllability (driveability) of the vehicle.

It is a further object of the invention to provide a driving wheel slip control system which is capable of properly controlling the excessive slip of driving wheels irrespective of the valve lift characteristic selected, by selecting the control gain to a value suitable for the time lag of the control system which varies with change in the manner of change in the engine output, even when the valve lift characteristic is changed to one enabling to obtain a smaller engine output during the driving wheel slip control.

To attain the above objects, according to a first aspect of the invention, there is provided a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of the driving wheels, and valve lift characteristic-changing means for changing the valve lift characteristic of the at least one set of the set of inlet valves and the set of exhaust valves when the excessive slip state of the at least one of the driving wheels is detected.

The valve control system according to the first aspect of the invention is characterized by comprising:

valve lift characteristic-restoring means responsive to an output from the driving wheel slip-detecting means for restoring the valve lift characteristic changed by the valve lift characteristic-changing means to one before the change, when the excessive slip state of the at least one of the driving wheels has been eliminated;

vehicular running condition-detecting means for detecting a specific running condition of the automotive vehicle; and inhibiting means responsive to an output from the vehicular running condition-detecting means for inhibiting restoring operation by the valve lift characteristic-restoring means when the vehicular running condition-detecting means detects the specific running condition of the automotive vehicle.

Preferably, the vehicular running condition-detecting means comprises vehicle speed-detecting means, the specific running condition of the automotive vehicle being a condition that the speed of the automotive vehicle is not equal to zero.

Alternatively, the vehicular running condition-detecting means comprises road surface friction coefficient-detecting means for detecting a friction coefficient of a road surface on which the automotive vehicle is running, the specific running condition of the automotive vehicle being a condition that the friction coefficient of the road surface detected is not higher than a predetermined value.

More preferably, when the friction coefficient is not higher than the predetermined value, the valve lift characteristic is held at one enabling to obtain a larger engine output when the engine is in a lower engine rotational speed region.

The valve control system according to a second aspect of the invention is characterized by comprising:

turning-detecting means for detecting turning of the automotive vehicle; and inhibiting means for inhibiting changing operation by the valve lift characteristic-changing means when the turning-detecting means detects turning of the automotive vehicle.

Preferably, the turning-detecting means comprises yaw rate-detecting means for detecting a yaw rate of the automotive vehicle.

Alternatively, the turning-detecting means comprises reference yaw rate-calculating means for calculating a predetermined reference yaw rate of the automotive vehicle.

Alternatively, the turning-detecting means comprises yaw rate-detecting means for detecting a yaw rate of the automotive vehicle, reference yaw rate-calculating means for calculating a predetermined reference yaw rate of the automotive vehicle, and difference-calculating means for calculating a difference between the yaw rate detected and the predetermined reference yaw rate calculated.

According to a third aspect of the invention, there is provided a system for controlling slip of at least one driving wheel of an automotive vehicle in which is installed an internal combustion engine having a set of inlet valves and a set of exhaust valves, including driving wheel speed-detecting means for detecting the speed of the at least one of the driving wheels of the automotive vehicle, vehicle speed-detecting means for detecting the speed of the automotive vehicle, difference-calculating means for calculating a difference between an output from the driving wheel speed-detecting means and an output from the vehicle speed-detecting means, feedback control amount-calculating means for calculating a feedback control amount based upon an output from the difference-calculating means and at least one predetermined gain, and driving wheel torque-reducing means responsive to an output from the feed back control amount-calculating means for reducing output torque of the driving wheels, The system according to the third aspect of the invention is characterized by comprising:

valve lift characteristic-changing means for changing the valve lift characteristic of at least one set of the sets of inlet and exhaust valves when the output from the feedback control amount-calculating means indicates an excessive slip state of the at least one of the driving wheels; and gain-changing means for changing the value of the at least one predetermined gain used by the feedback control amount-calculating means, when the valve lift characteristic is changed by the valve lift characteristic-changing means.

According to a fourth aspect of the invention, there is provided a valve control system for controlling the valve lift characteristic of at least one set of a set of inlet valves and a set of exhaust valves of an internal combustion engine installed in an automotive vehicle having driving wheels, comprising:

valve lift characteristic-changing means for changing the valve lift characteristic of the at least one set of the set of inlet valves and the set of exhaust valves in a predetermined valve lift characteristic-changing control manner;

road surface condition-detecting means for detecting a condition of a road surface on which the automotive vehicle is running; and control manner-changing means responsive to an output from the road surface condition-detecting means for changing the predetermined valve lift characteristic-changing control manner.

Preferably, the road surface condition-detecting means comprises means for detecting a friction coefficient of the road surface, the control manner-changing means operating to decrease frequency of changing of the valve lift characteristic, when the friction coefficient detected is not higher than a predetermined value.

According to a fifth aspect of the invention, there is provided a valve control system for controlling the valve lift characteristic of at least one set of a set of inlet valves and a set of exhaust valves of an internal combustion engine installed in an automotive vehicle having driving wheels, comprising:

valve lift characteristic-changing means for changing the valve lift characteristic of the at least one set of the set of inlet valves and the set of exhaust valves in a predetermined valve lift characteristic-changing control manner;

turning-detecting means for detecting turning of the automotive vehicle; and control manner-changing means for changing the predetermined valve lift-changing control manner, when the turning-detecting means detects turning of the automotive vehicle.

Preferably, the control manner-changing means operates to inhibit changing of the valve lift characteristic, when the turning-detecting means detects turning of the automotive vehicle.

The above and other objects, features, and advantages of the invention will become more apparent from the ensuing detailed description taken in conjunction with the accompanying drawings.

BRIEF DESCRIPTION OF THE DRAWINGS

FIG. 2b is a diagram showing a control device for the device of FIG. 2a;

DETAILED DESCRIPTION

The invention will now be described in detail with reference to the drawings showing embodiments thereof.

FIGS. 1 to 6 show a first embodiment of the invention.

Figure 1:
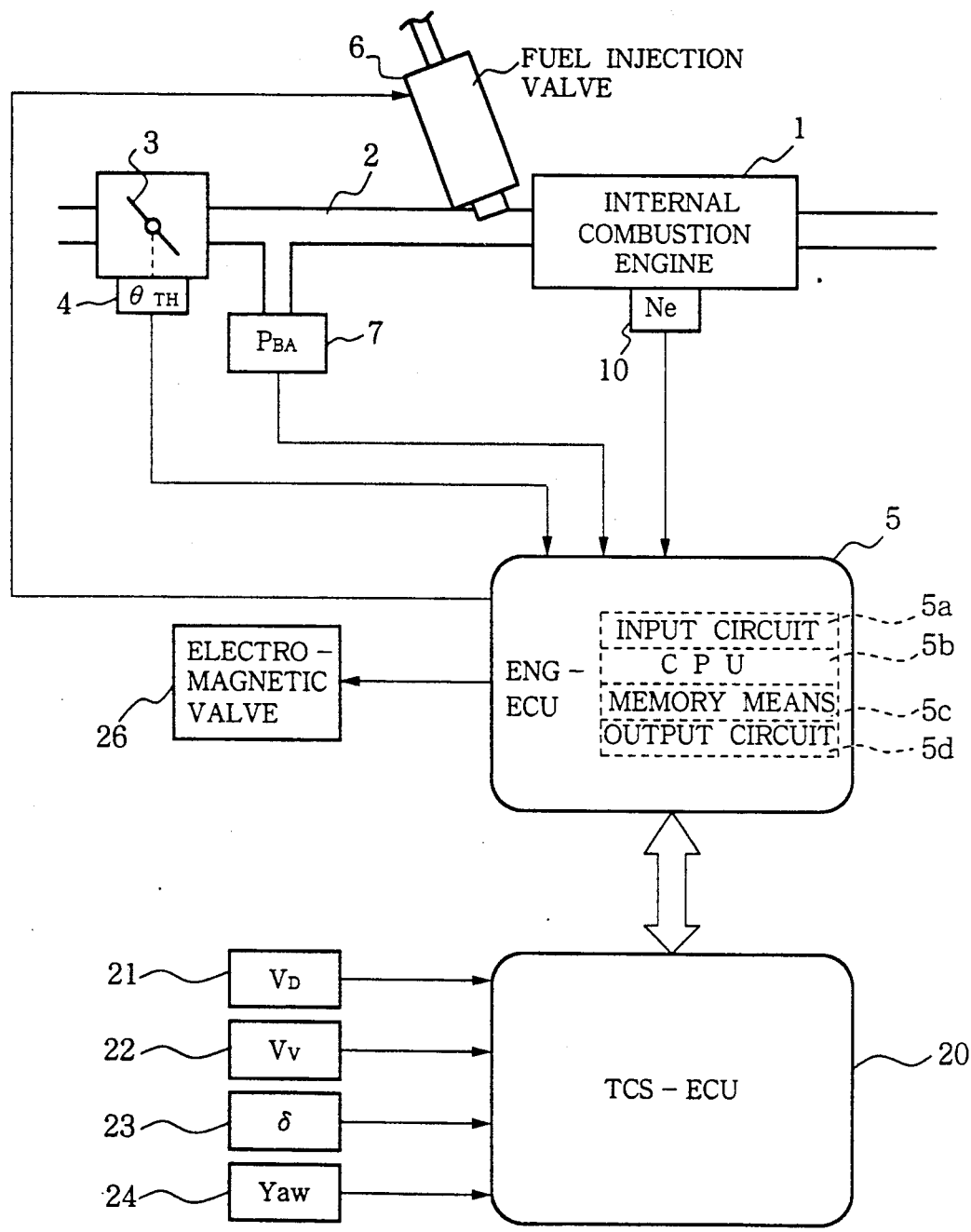
FIG. 1 is a schematic diagram showing the whole arrangement of a valve control system according to one embodiment of the invention.

Referring first to FIG. 1, there is shown the whole arrangement of a fuel supply control system for an internal combustion engine, which incorporates a valve control system according to the invention. In the figure, reference numeral 1 designates an internal combustion engine of six cylinder DOHC type for automotive vehicles, in which two pairs of inlet and exhaust valves are provided for each cylinder. Connected to the cylinder block of the engine 1 is an intake pipe 2 in which is arranged a throttle valve 3. A throttle valve opening ($\theta_{TH}$) sensor 4 is connected to the throttle valve 3 for generating an electric signal indicative of the sensed throttle valve opening and supplying same to an electronic control unit 5 for controlling the engine (hereinafter called "the ENG-ECU).

Fuel injection valves 6, only one of which is shown, are inserted into the intake pipe at locations intermediate between the cylinder block of the engine 1 and the throttle valve 3 and slightly upstream of respective intake valves, not shown. The fuel injection valves 6 are connected to a fuel pump, not shown, and electrically connected to the ENG-ECU 5 to have their valve opening periods controlled by signals therefrom.

On the other hand, an intake pipe absolute pressure ($P_{BA}$) sensor 7 is provided in communication with the interior of the intake pipe 2 at a location immediately downstream of the throttle valve 3 for supplying an electric signal indicative of the sensed absolute pressure within the intake pipe 2 to the ENG-ECU 5. An engine rotational speed (Ne) sensor 10 is arranged in facing relation to a camshaft or a crankshaft, not shown, of the engine 1. The engine rotational speed sensor 10 generates a pulse as a TDC signal pulse at each predetermined crank angles whenever the crankshaft rotates through 120 degrees, and the pulse is supplied to the ENG-ECU 5.

Further electrically connected to the ENG-ECU 5 is an electronic control unit 20 for sensing driving wheel slip (hereinafter called "TCS-ECU"), to which are connected a driving wheel speed sensor 21 for detecting the rotational speed $V_D$ of driving wheels, not shown, a trailing wheel speed sensor 22 for detecting a rotational speed $V_V$ of trailing wheels, not shown, a steering angle sensor for detecting the steering angle $\delta$ of a steering wheel, not shown, and a yaw rate sensor 24 for detecting the yaw rate Yaw of the vehicle. Signals indicative of the rotational speeds of the wheels, the steering angle, and the yaw rate respectively detected by the sensors 21 to 24 are supplied to the TCS-ECU 20. The driving wheel speed sensor 21 detects an average value of the speed of a right driving wheel and the speed of a left driving wheel, while the trailing wheel speed sensor 22 detects an average value of the speed of a right trailing wheel and the speed of a left trailing wheel, respectively. However, this is not limitative, and the speeds of driving and trailing wheels on one side of the vehicle may be detected (provided that the driving wheel speed and the trailing wheel speed are detected on the same side). The steering sensor 23 generates a signal indicative of an absolute angle of steering such that the rightward steering angle is represented by a positive value (e.g. +1°, +2° ....) and the leftward steering angle by a negative value (e.g. −1°, −2° ...), with the neutral position of the steering wheel represented by zero degree. The yaw rate sensor 24 detects an actual yaw rate based on the difference between separately detected speeds of the right and left trailing wheels. As the yaw rate sensor, a gyroscope may be used which is adapted to directly detect the actual yaw rate.

The ENG-ECU 5 is also connected to an electromagnetic valve 26, which changes over the valve timing of inlet and exhaust valves, as described in detail hereinafter. The term "valve timing" is identical in meaning to the term "valve lift characteristic".

The ENG-ECU 5 comprises an input circuit 5a having the functions of shaping the waveforms of input signals from various sensors and the TCS-ECU 20, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6 and the electromagnetic valve 26.

The CPU 5b operates in response to engine parameter signals from the above-mentioned sensors and other sensors, not shown, to determine operating conditions in which the engine 1 is operating, such as an air-fuel ratio feedback control region for controlling the air-fuel ratio to a stoichiometric air-fuel ratio, and open-loop control regions, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5:

$$T_{OUT} = Ti \times K_{TCS} \times K_1 + K_2 \qquad (1)$$

where Ti represents a basic fuel amount, more specifically a basic fuel injection period of the fuel injection valves 6, which is determined based upon the engine rotational speed Ne and the intake pipe absolute pressure $P_{BA}$.

$K_{TCS}$ represents a leaning coefficient which is set to a value smaller than 1.0, as described in detail hereinafter, when an excessive slip state of the driving wheels is detected, and set to 1.0 when no excessive slip state is detected.

$K_1$ and $K_2$ represent other correction coefficients and correction variables, respectively, which are calculated based on various engine operating parameter signals to such values as to optimize operating characteristics of the engine such as fuel consumption and accelerability, depending on operating conditions of the engine.

The CPU 5b turns the electromagnetic valve 26 on and off to effect changeover of the valve timing in response to the detected engine operating conditions (e.g. sensed values of the engine rotational speed Ne, the intake pipe absolute pressure $P_{BA}$, and the engine coolant temperature $T_W$) and the slip state of driving wheels, as described hereinafter.

The CPU 5b supplies the output circuit 5d with driving signals for driving the fuel injection valves 6 and the electromagnetic valve 26 based upon the results of the above determinations and calculations.

In this embodiment, the ENG-ECU comprises part of valve lift characteristic-changing means, part of valve lift characteristic-restoring means, inhibiting means for inhibiting restoration of the valve lift characteristic, and suppressing means for suppressing change of the valve lift characteristic, while the TCS-ECU 20 comprises part of the driving wheel slip-detecting means, part of vehicular running condition-detecting means, and part of turning-detecting means.

Figure 2A:
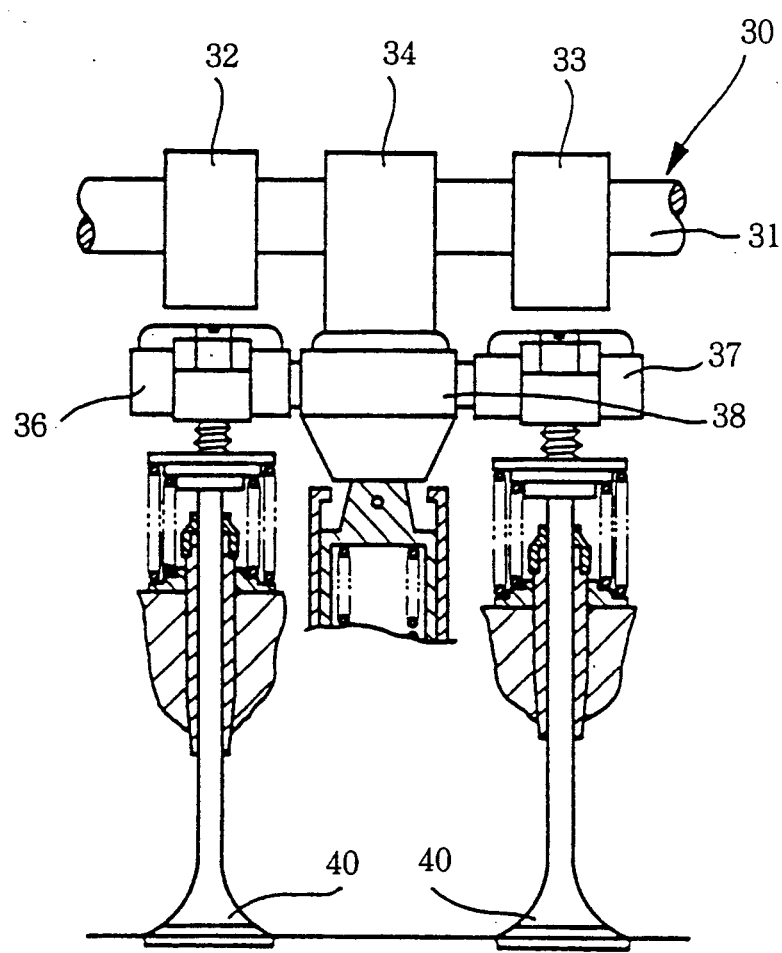
FIG. 2a is a diagram showing an inlet valve-operating device of an engine.
Figure 2B:
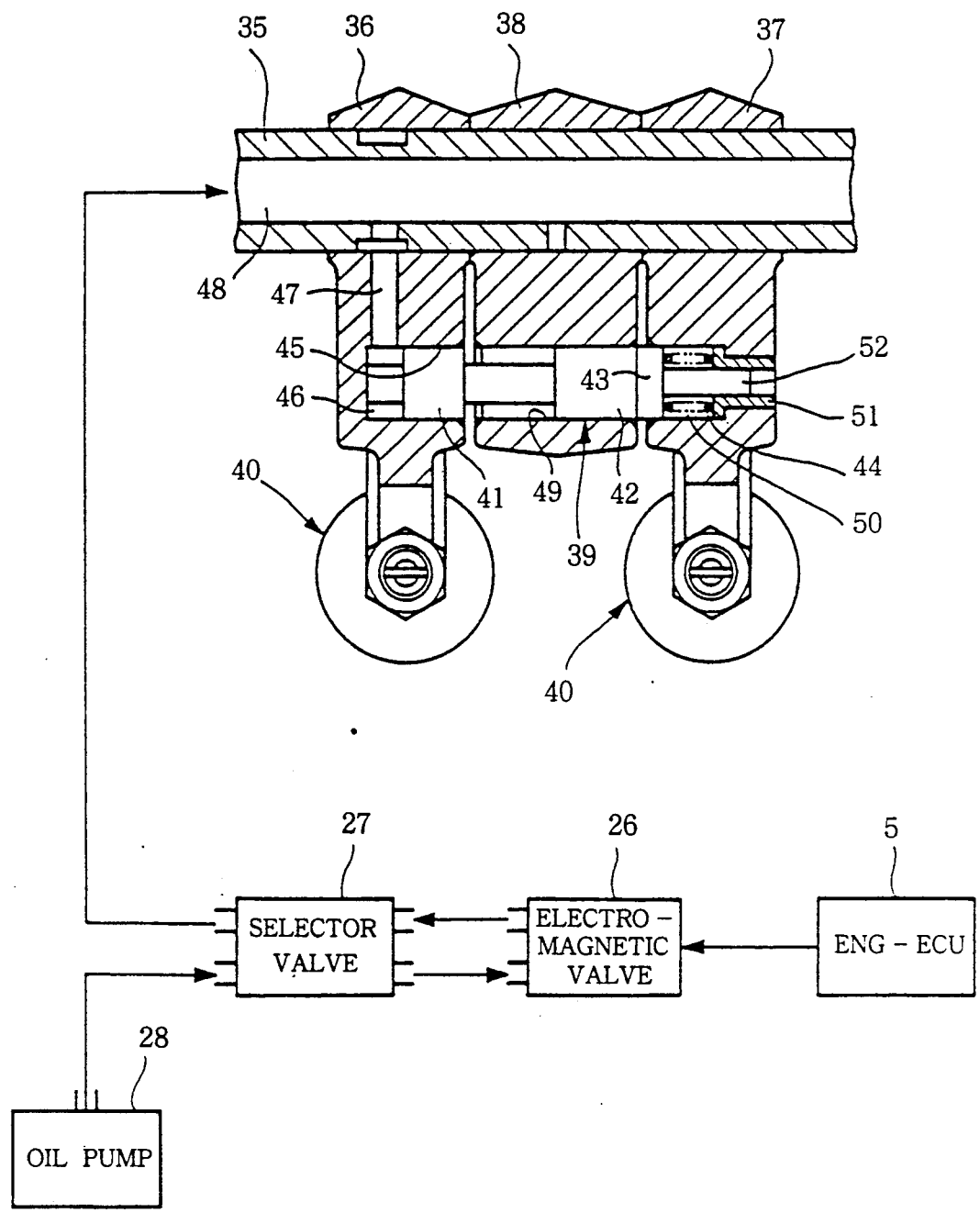

FIGS. 2a and 2b show an inlet valve-operating device 30 for driving the inlet valves 40 of each cylinder of the engine 1. An exhaust valve-operating device, not shown, basically having the same construction as the device 30 is provided for the exhaust valves. The inlet valve-operating device 30 comprises a camshaft 31 rotatively driven by a crankshaft, not shown, of the engine at a speed ratio of ½ relative to the latter, a high speed cam 34 and low speed cams 32, 33 secured on the camshaft 31, the three cams 32 to 34 being provided for each cylinder, a rocker shaft 35 extending parallel with the camshaft 31, first and second driving rocker arms 36 and 37, and a free rocker arm 38 pivotally mounted on the rocker shaft 35, the three arms 36 to 38 being provided for each cylinder, and a connection-changeover mechanism 39 arranged in the corresponding rocker arms 36, 37, 38 for each cylinder.

As shown in FIG. 2b, the connection-changeover mechanism 39 comprises a first changeover pin 41 capable of connecting the first driving rocker arm 36 with the free rocker arm 38, a second changeover pin 42 capable of connecting the second driving rocker arm 37 with the free rocker arm 38, a restriction pin 43 for restricting the movement of the first and second changeover pins 41, 42, and a return spring 44 urging the pins 41, 42, 43 in the rocker arm-disconnecting direction.

The first driving rocker arm 36 is formed therein with a first guide bore 45 extending parallel with the rocker shaft 35 with one end thereof closed and the other end opening in a side face thereof facing the free rocker arm 38. The first changeover pin 41 is slidably fitted in the first guide bore 45, defining an oil hydraulic chamber 46 between one end thereof and the closed end of the first guide bore 45. Further, a passage 47 extends in the rocker arm 36 and the rocker shaft 35 from the oil hydraulic chamber 46 and opens into an oil feeding passage 48 formed in the rocker shaft 35 so that the oil feeding passage 48 permanently communicates via the passage 47 with the oil hydraulic chamber 46 irrespective of rocking motion of the first driving rocker arm 36.

The free rocker arm 38 is formed therein with a guide through hole 49 at a location corresponding to the first guide bore 45, which extends through the free rocker arm 38 and parallel with the rocker shaft 35. The second changeover pin 42 is slidably fitted in the guide through hole 49, with one end thereof abutting on an opposed end face of the first changeover pin 41.

The second driving rocker arm 37 is formed therein with a second guide bore 50 at a location corresponding to the guide through hole 49, which extends parallel with the rocker shaft 35 with one end thereof opening toward the free rocker arm 38. The restriction pin 43 in the form of a disc is slidably fitted in the second guide bore 50, in a fashion abutting on the other end of the second changeover pin 42. Further, the second guide bore 50 has a guide sleeve 51 fitted therein, in which is slidably fitted an axial rod 52 which coaxially and integrally projects from the restriction pin 43. The return spring 44 is interposed between the guide sleeve 51 and the restriction pin 43 and urges the pins 41, 42, 43 toward the oil hydraulic chamber 46.

In the connection-changeover mechanism 39 constructed as above, when the pressure in the oil hydraulic chamber 46 is increased, the first changeover pin 41 is forced to move into the guide through hole 49 and at the same time the second changeover pin 42 is urgedly moved into the second guide bore 50 to connect the rocker arms 36, 37, 38 together. When the pressure in the oil hydraulic chamber 46 is decreased, the first changeover pin 41 is moved back by the urging force of the spring 44 into a position in which the end face thereof abutting on the second changeover pin 42 corresponds in location to the space between the first driving rocker arm 36 and the free rocker arm 38, and at the same time the second changeover pin 42 is moved back into a position in which the end face thereof abutting on the restriction pin 43 corresponds in location to the space between the free rocker arm 38 and the second driving rocker arm 37, whereby the rocker arms 36, 38, 37 become disconnected from each other.

The oil feeding passage 48 within the rocker shaft 35 is connected to an oil pump 28 via a selector valve 27 which operates to change over the oil pressure within the oil feeding passage 48 and hence the oil pressure within the oil hydraulic chamber 46 of the connection-changeover mechanism 39 between high and low levels. The selector valve 27 is connected to the electromagnetic valve 26, and the ENG-ECU controls the changeover operation of the selector valve 27 via the electromagnetic valve 26.

The inlet valve-operating device 30 of the engine 1 constructed as above operates in the following manner (in addition, the exhaust valve-operating device operates similarly):

When the ENG-ECU 5 sends out a valve-opening instruction signal to the electromagnetic valve 26, the electromagnetic valve 26 is opened to thereby cause the selector valve 27 to open, so that the oil pressure in the oil feeding passage 48 is increased. This causes the connection-changeover mechanism 39 to operate to connect the rocker arms 36, 37, 38 together, whereby the high speed cam 34 operates the rocker arms 36, 37, 38 in unison (FIG. 2a shows this state) to cause each pair of inlet valves 40 to open and close at high speed valve timing in which the valve-opening period and the valve lift amount are relatively greater.

On the other hand, when the ENG-ECU 5 supplies a valve-closing instruction signal to the electromagnetic valve 26, the electromagnetic valve 26 and in the turn the selector valve 27 are closed to thereby decrease the oil pressure in the oil feeding passage 48. This causes the connection-changeover mechanism 39 to operate to disconnect the rocker arms 36, 37, 38 from each other, whereby the low speed cams 32, 33 operate the corresponding rocker arms 36, 37 to cause the pair of inlet valves 40 to open and close at low speed valve timing in which the valve-opening period and the valve lift amount are relatively smaller.

Figure 3:
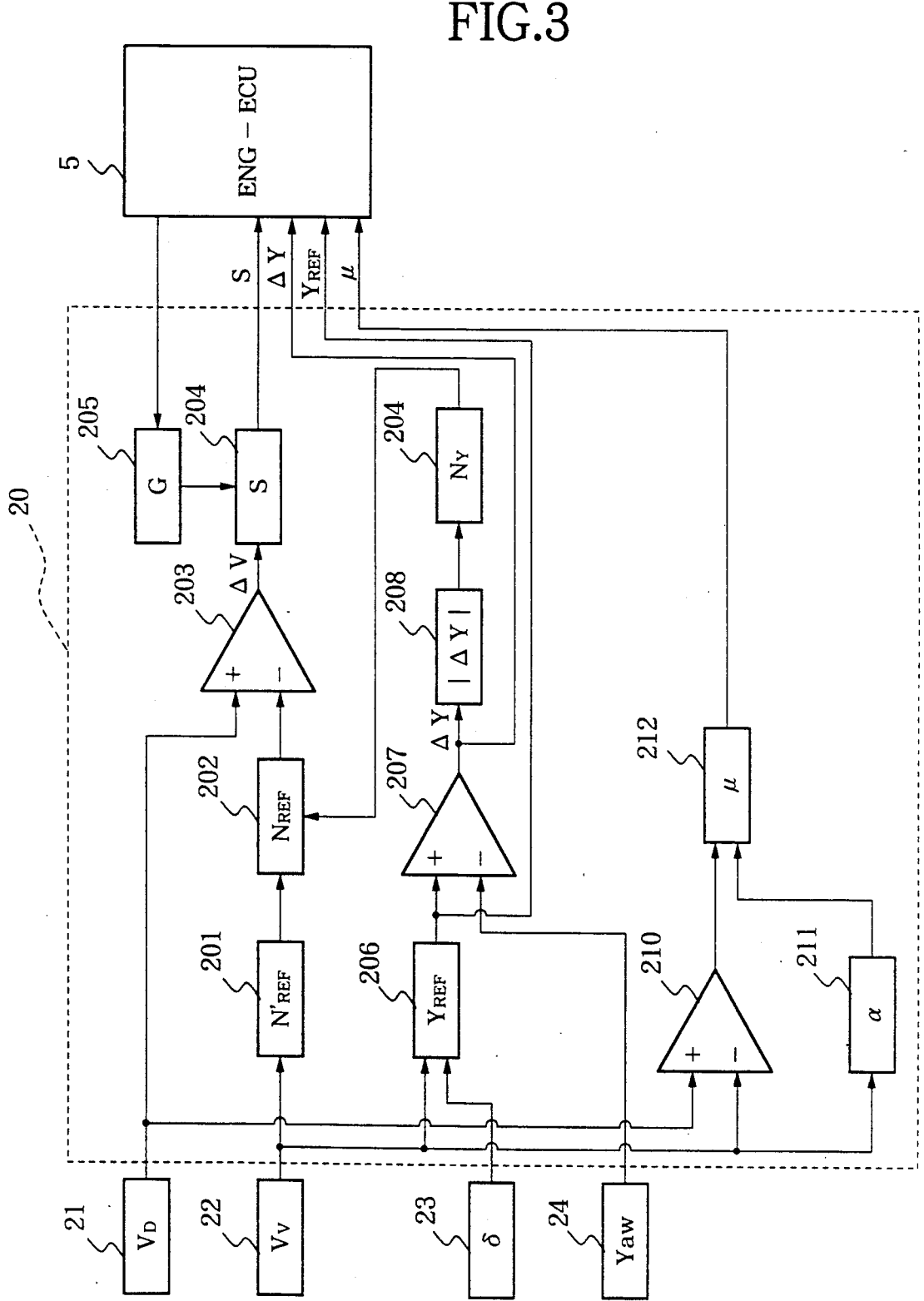
FIG. 3 is a block diagram showing the arrangement of an electronic control unit for detecting the slip of driving wheels.

FIG. 3 shows the internal construction of the TCS-ECU 20. A signal indicative of the driving wheel speed $V_D$ from the driving wheel speed sensor 21 is supplied to a first subtraction circuit 203 and a third substraction circuit 210. A signal indicative of the vehicle speed $V_V$ from the trailing wheel speed sensor 22 is supplied to a first reference driving wheel speed ($N'_{REF}$)-calculating circuit 201, a reference yaw rate ($Y_{REF}$)-calculating circuit 206, a third subtraction circuit 210, and an acceleration ($a$)-calculating circuit 211. A signal indicative of the steering angle $\delta$ from the steering angle sensor 23 is supplied to the reference yaw rate-calculating circuit 206, while a signal indicative of the yaw rate Yaw from the yaw rate sensor 24 is supplied to the second substraction circuit 207.

The first reference driving wheel speed-calculating circuit 201 calculates a first reference driving wheel speed $N'_{REF}$ based on the trailing wheel speed, i.e. vehicle speed $V_V$, and supplies the calculated first reference driving wheel speed $N'_{REF}$ to a second reference driving wheel speed-calculating circuit 202. The first reference driving wheel speed $N'_{REF}$ is determined based on the relationship between the vehicle speed and the driving wheel speed, which holds when the slip rate of driving wheels is approximately 15% (at which the maximum driving force can be obtained) and the vehicle is making a straight advance.

The reference yaw rate-calculating circuit 206 calculates a reference yaw rate $Y_{REF}$ as a yaw rate currently expected from the vehicle speed $V_V$ and the steering angle δ and supplies the calculated reference yaw rate $Y_{REF}$ to the second subtraction circuit 207. The reference yaw rate is calculated by an equation based on a mathematical model of a vehicle (disclosed e.g. by Japanese Provisional Patent Publication (Kobai) No. 61-27763) or by an equation based on a physical model of same (disclosed e.g. by Japanese Provisional Patent Publication (kokai) No. 63-218866). The second subtraction circuit 207 calculates a yaw rate difference ΔY between the reference yaw rate $Y_{REF}$ and the detected actual yaw rate Yaw, and supplies the calculated yaw rate differerence ΔY to an absolute value-calculating circuit 208. The absolute value-calculating circuit 208 converts the yaw rate difference ΔY into an absolute value of $|ΔY|$, and supplies the latter to a correction value ($N_Y$)-calculating circuit 209. The correction value-calculating circuit 209 calculates a correction value $N_Y$ for the reference driving wheel speed based on the absolute value $|ΔY|$ of the yaw rate difference, and supplies the calculated corrected value $N_Y$ to the second reference driving wheel speed-calculating circuit 202. The correction value $N_Y$ is for correcting the first reference driving wheel speed $N'_{REF}$ to a smaller value when there is a large difference (corresponding to the yaw rate difference ΔY) between a yawing movement of the vehicle intended by the driver (corresponding to the reference yaw rate $Y_{REF}$) and an actual yawing movement of the vehicle (corresponding to the actual yaw rate Yaw), and therefore contributes to decreasing the engine output.

The second reference driving wheel speed-calculating circuit 202 calculates the second reference driving wheel speed $N_{REF}$ based upon the following equation (2):

$$N_{REF} = N'_{REF} - N_Y \quad (2)$$

and supplies the calculated second reference driving wheel speed $N_{REF}$ to the first subtraction circuit 203.

The first subtraction circuit 203 calculates a speed difference ΔV between the driving wheel speed $V_D$ and the second reference driving wheel speed $N_{REF}$, and supplies the calculated speed difference ΔV to a slip signal (S)-calculating circuit 204. The slip signal-calculating circuit 204 applies control gains $K_P$, $K_I$, and $K_D$ for PID control supplied from the ENG-ECU 5 via a gain setting circuit 205 to the following equations (3) to (6) to calculate a slip signal S:

$$S = SP_n + SI_n + SD_n \quad (3)$$

$$SP_n = K_P \times \Delta V_n \quad (4)$$

$$SI_n = SI_{n-1} + K_I \times \Delta V_n \quad (5)$$

$$SD_n = K_D \times (\Delta V_n - \Delta V_{n-1}) \quad (6)$$

The subscripts n and n−1 indicate that the values concerned are present values and last values, respectively, since the calculation is repeated in a predetermined cycle.

The slip signal S is supplied to the ENG-ECU 5 together with the reference yaw rate $Y_{REF}$ and the yaw rate difference ΔY.

In the meanwhile, the third subtraction circuit 210 calculates a speed difference $\Delta V_W$ between the driving wheel speed $V_D$ and the vehicle speed $V_V$, and supplies the calculated speed difference $\Delta V_W$ to a friction coefficient (μ)-calculating circuit 212. The acceleration-calculating circuit 211 calculates the acceleration α of the vehicle speed $V_V$, and supplies the calculated acceleration α to the friction coefficient-calculating circuit 212. The friction coefficient-calculating circuit 212 calculates an estimated value μ of friction coefficient of the road surface (hereinafter simply referred to as "μ of the road surface), and supplies the calculated μ of the road surface to the ENG-ECU 5.

In this connection, the manner of obtaining the correction coefficient μ of the road surface is not limited to the above-mentioned estimation based on the speed difference $\Delta V_W$ and the acceleration α of the vehicle, and the μ of the road surface may be detected by a sensor (e.g. a combination of an ultrasonic sensor and a road surface temperature sensor) which detects an actual correction coefficient.

Figure 4B:
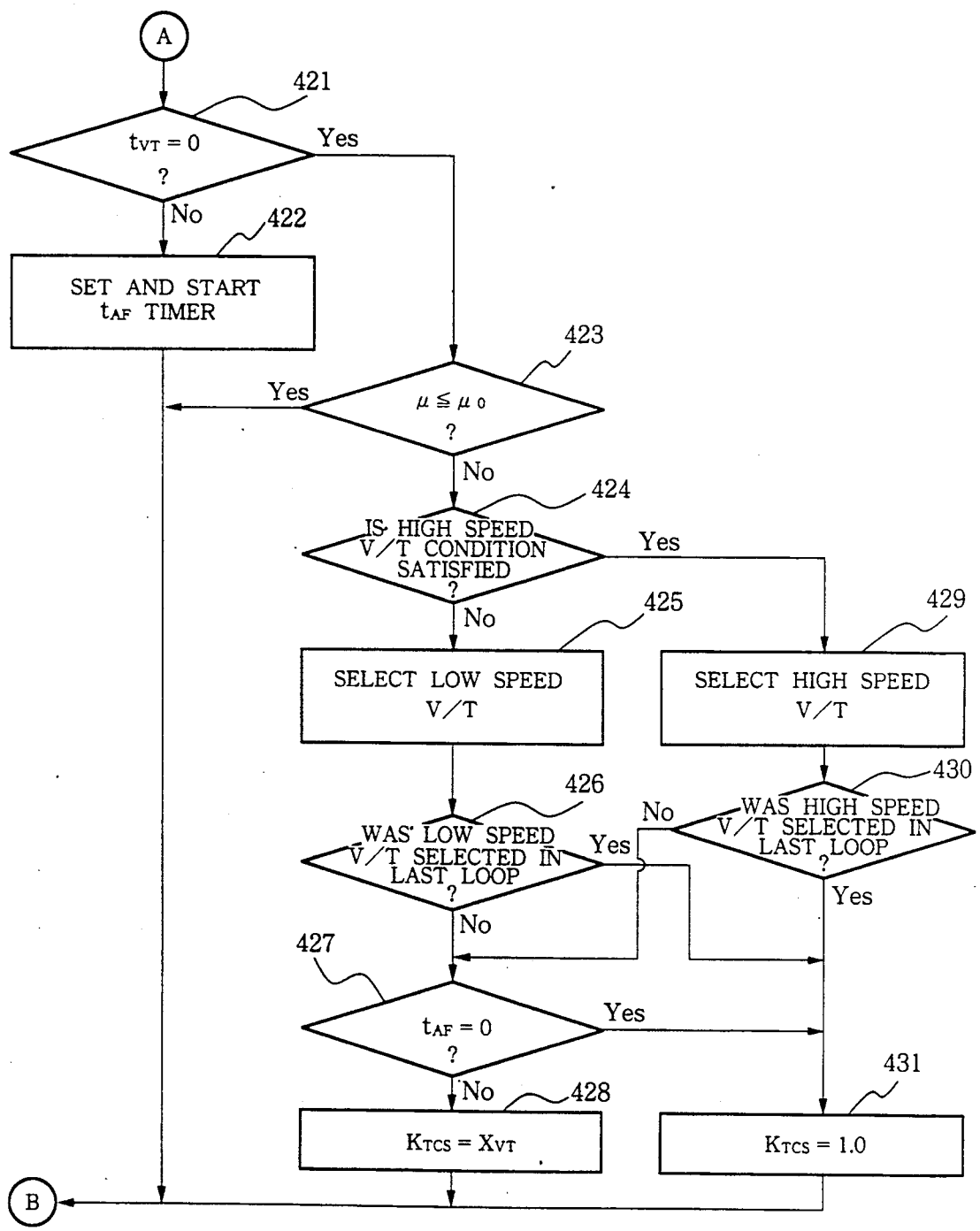
FIG. 4 comprised of FIG. 4A and FIG. 4B, is a flowchart showing a program for carrying out the driving wheel slip control and the valve lift characteristic-changing control according to a first embodiment of the invention.
Figure 5:
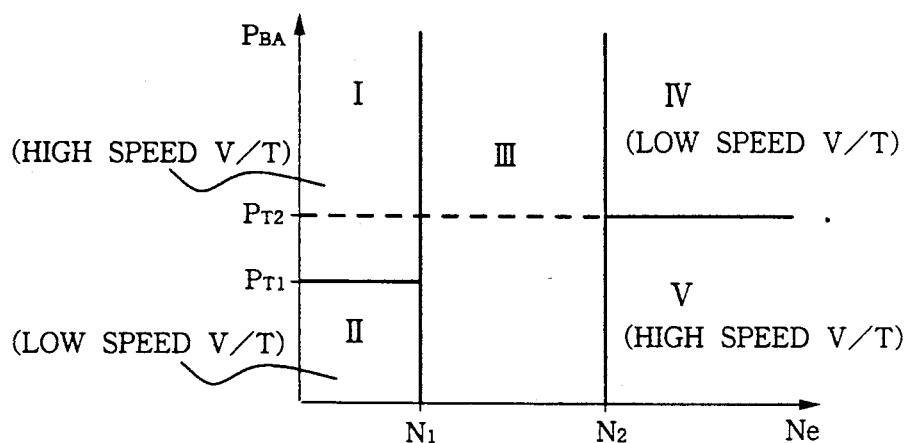
FIG. 5 is diagram useful in explaining the manner of selecting a valve lift characteristic depending on the engine rotational speed and the intake pipe absolute pressure during the driving wheel slip control.

FIG. 4 shows a program executed by the ENG-ECU 5 for carrying out engine output control (hereinafter simply referred to as "the traction control") through leaning of an air-fuel mixture supplied to the engine 1 and cutting-off of the supply of the mixture based on the signals from the TCS-ECU, as well as the valve timing control. This program is executed in synchronism with generation of each TDC signal pulse.

First, at a step 401, it is determined whether or not the traction control should be carried out. This determination depends on whether or not a predetermined condition (e.g. the slip signal S is above a predetermined value) is satisfied. If the answer to this question is affirmative (Yes), i.e. if it is determined that the traction control should be carried out, the leaning coefficient $K_{TCS}$ is set at a step 402 to a first predetermined leaning value $X_{TCS}$ (which causes the air/fuel ratio to be leaned to approximately 18.0). Then, the number $N_{FC}$ of cylinders which are to be subjected to fuel cut is selected at a step 403 depending on the value of the slip signal S, and cylinders which are to be subjected to fuel cut are decided at a step 404 in accordance with the selected number $N_{FC}$. The number $N_{FC}$ of cylinders to be subjected to fuel cut is set to a larger value as the value of the slip signal S increases, i.e. as the magnitude of slip of at least one driving wheel is larger. For example, with an engine having six cylinders No. 1 to No. 6, if the $N_{FC}=3$, the cylinders Nos. 1, 3, and 5 are subjected to fuel cut.

At a step 405, it is determined whether or not the μ of the road surface estimated by the TCS-ECU 20 is equal to or lower than the predetermined value $μ_0$. If the answer to this question is affirmative (Yes), i.e. if $μ \leq μ_0$, the low speed valve timing is selected at a step 411. Then, the $t_{OFF}$ timer is set to the first predetermined time period $t_{OFF}$ and started at a step 412, followed by terminating the present program.

If the answer to the question of the step 405 is negative (No), i.e. if $μ > μ_0$, it is determined at a step 406 whether or not the engine rotational speed is equal to or lower than the first predetermined engine rotational speed $N_1$ (e.g. 2,000 rpm). If the answer to this question is affirmative (Yes), i.e. if $Ne \leq N_1$, it is determined at a step 410 whether or not the intake pipe absolute pressure $P_{BA}$ is equal to or higher than a first predetermined pressure level $P_{T1}$ (e.g. 550 mmHg). If the answer to this question is negative, i.e. if $P_{BA} < P_{T1}$, the low speed valve timing is selected at a step 411, whereas if the answer is affirmative, i.e. if $P_{BA} \geq P_{T1}$, the high speed valve timing is selected at a step 409, and then the program proceeds to the step 412.

If the answer to the question of the step 406 is negative (No), i.e. if $Ne > N_1$, it is determined at a step 407 whether or not the engine rotational speed Ne is equal to or higher than the second predetermined engine rotational speed $N_2$ (e.g. 5,000 rpm) which is higher than the first predetermined engine rotational speed $N_1$. If the answer to this question is affirmative (Yes), i.e. if $Ne \geq N_2$, it is determined at a step 408 whether or not the intake pipe absolute pressure $P_{BA}$ is equal to or higher than a second predetermined pressure level $P_{T2}$ (e.g. 620 mmHg) which is higher than the first predetermined pressure level. If the answer to this question is affirmative (Yes), i.e. if $P_{BA} \geq P_{T2}$, the low speed valve timing is selected at a step 411, whereas if the answer is negative (No), i.e. if $P_{BA} < P_{T2}$, the high speed valve timing is selected at a step 409, and then the program proceeds to the step 412.

If both the answers to the questions of the steps 406 and 407 are negative (No), i.e. if $N_1 < Ne < N_2$, the program jumps to the step 412 to thereby hold the valve timing selected up the last loop.

Thus, if the $\mu$ of the road surface is equal to or lower than the predetermined valve $\mu_0$, i.e. if the road surface is slippery, the low speed valve timing is selected irrespective of engine operating conditions, so that it is possible to decrease the frequency of changeover of the valve timing to thereby prolong to life of the connection-changeover mechanism 39. Further, under a high engine rotational speed condition, the low speed valve timing is selected to thereby prevent generation of unnecessarily high engine torque. Also under a low engine rotational speed condition, the selection of the low speed valve timing is advantageous in securing required control responsiveness. More specifically, once the excessive slip state of the driving wheel(s) has been eleminated by the traction control (by leaning of air/fuel ratio or fuel cut), it is desirable to rapidly increase the engine output torque to thereby improve the control responsiveness. Under a low engine rotational speed condition, the firing interval which determines the period of change of the engine output is longer than that under a high engine rotational speed condition, and therefore the engine output can be increase more rapidly by increasing the output torque obtained by each firing through selection of the low speed valve timing at which larger output torque can be obtained under low engine rotational speed condition.

Further, according to the steps 406 to 409, when the $\mu$ of the road surface is higher than the predetermined value $\mu_0$, the high speed valve timing is selected in regions I and V, the low speed valve timing is selected in regions II and IV, and the valve timing in the last loop is held in a region III. Thus, in the region III, the changeover of valve timing is not carried out, and in a region of $Ne \leq N_1$ or $Ne \geq N_2$, the valve timing enabling to obtain a smaller engine output (hereinafter referred to as "opposite valve timing") is selected (i.e. the valve timing is changed over when an excessive slip state is detected) only under a high engine load condition (i.e. $P_{BA} > P_{T1}$ or $P_{T2}$). This makes it possible to decrease the frequency of the valve timing to thereby prolong the lift of the connection-changeover mechanism 39.

If the answer to the question of the step 401 is negative (No), i.e. if it is determined that the traction control is not required, it is determined at a step 413 whether or not the traction control was carried out in the last loop. If the answer to this question is negative (No), the program jumps to a step 415, whereas if the answer is affirmative (Yes), the number $N_{FC}$ of cylinders to be subjected to fuel cut is decreased by 1 at a step 414, and then the program proceeds to the step 415. At the step 415, it is determined whether or not the value of the $t_{OFF}$ timer is equal to 0. If the answer to this question is negative (No), i.e. if the first predetermined time period $t_{OFF}$ has not elapsed, a $t_{VT}$ timer referred to hereinafter is set to a second predetermined time period $t_{VT}$, and started (a step 419). At the same time, similarly to the step 404, the number of cylinders to be subjected to fuel cut is determined in accordance with the number $N_{FC}$ at a step 420, followed by terminating the present program.

If the answer to the question of the step 415 is affirmative (Yes), i.e. $t_{OFF}=0$, it is determined at a step 416 whether or not the number $N_{FC}$ of cylinders to be subjected to fuel cut is equal to 0. If the answer to this question is negative (No), i.e. if $N_{FC} > 0$, the number $N_{FC}$ is decreased by 1 at a step 417. Then, the $t_{OFF}$ timer is set to the first predetermined time period $t_{OFF}$ and started (a step 418), and the program proceeds to the step 419.

The above-described steps 413 to 420 carry out the engine output control when the vehicle has shifted from a state in which the traction control is required to a state in which it is not required. Immediately after the traction control becomes unnecessary, the number $N_{FC}$ of cylinders to be subjected to fuel cut is decreased by 1 (the step 414), and thereafter, the number $N_{FC}$ is decreased by 1 whenever the first predetermined time period $t_{OFF}$ elapses until it becomes equal to 0 (the steps 416 and 417). Thus, the number of cylinders to be subjected to fuel cut is progressively decreased, which enables to prevent a sudden rise in the engine output immediately after the excessive slip state of the driving wheel(s) has been eliminated to thereby improve the driveability of the vehicle.

If the answer to the question of the step 416 is affirmative (Yes), i.e. if $N_{FC}=0$, it is determined at a step 421 whether or not the value of the $t_{VT}$ timer is equal to 0. If the answer to this question is negative (No), i.e. if $t_{VT} > 0$, a $t_{AF}$ timer referred to hereinafter is set to a third predetermined time period $t_{AF}$ and started at a step 422, followed by terminating the present program.

According to the steps 413 to 422, when the traction control becomes unnecessary, changeover of the valve timing is inhibited over a time period T defined by the following equation (7) so that the valve timing is held at one selected immediately before the traction control becomes unnecessary over the time period T:

$$T = t_{OFF} \times N_{FCO} + t_{VT} \qquad (7)$$

where $N_{FCO}$ is a value of $N_{FC}$ assumed immediately before the traction control becomes unnecessary.

The engine output control by the steps 413 to 421 makes it possible to prevent increases in the frequency of changeover of the valve timing resulting from hunting, i.e. repeated changeover of the valve timing such that elimination of an excessive slip state of the driving wheel(s) causes changeover of the valve timing to normal one, which results in an excessive slip state, causing another changeover of the valve timing.

If the answer to the question of the step 421 is affirmative (Yes), i.e. if $t_{VT}=0$, it is determined at a step 423 whether or not the $\mu$ of the road surface is equal to or lower than the predetermined value $\mu_0$. If the answer to this question is affirmative (Yes), i.e. if $\mu \leq \mu_0$, which means that the road surface is slippery, the present program is terminated without proceeding to steps 424 et seq where normal changeover of the valve timing is carried out, to thereby hold the valve timing in the last loop.

Thus, it is possible to prevent hunting resulting from occurrence of an excessive slip state of the driving wheel(s) which is triggered by changeover of the valve timing when the vehicle is on a slippery road surface, whereby the controllability of the vehicle can be improved and the frequency of changeover of the valve timing can be decreased to thereby prolong the life of the connection-changeover mechanism 39.

If the answer to the question of the step 423 is negative (No), i.e. if $\mu > \mu_0$, it is determined at a step 424 whether or not a condition that the high speed valve timing should be selected is satisfied. This determination is carried out e.g. based upon the engine rotational speed Ne, the intake pipe absolute pressure $P_{BA}$, the engine coolant temperature $T_W$, etc. to thereby select valve timing enabling to obtain a larger engine output.

Figure 6:
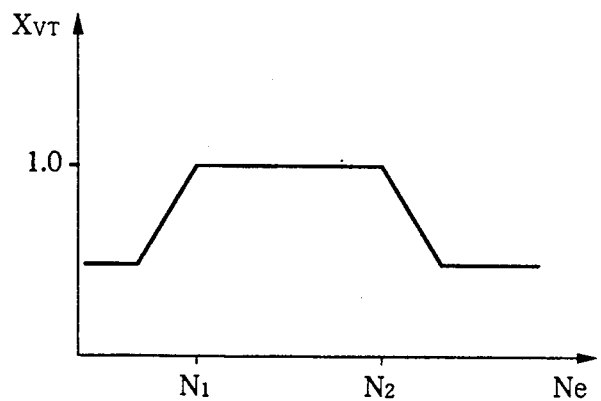
FIG. 6 is a graph showing an example of setting of a predetermined value for leaning an air-fuel mixture.

If the answer of the question of the step 424 is negative (No), i.e. the condition of selecting the high speed valve timing is not satisfied, the low speed valve timing is selected at a step 425, and then it is determined at a step 426 whether or not the low speed valve timing was selected in the last loop. If the answer to this question is affirmative (Yes), the leaning coefficient $K_{TCS}$ is set to a value of 1.0 at a step 431, followed by terminating the present program. On the other hand, if the answer to the question of the step 426 is negative (No), i.e. if the high speed valve timing was selected in the last loop, it is determined at a step 427 whether or not the value of the $t_{AF}$ timer is equal to 0. If the answer to this question is affirmative (Yes), i.e. if $t_{AF}=0$, the program proceeds to the step 431, whereas if the answer is negative (No), i.e if $t_{AF}>0$, the leaning coefficient $K_{TCS}$ is set to a second predetermined leaning value $X_{VT}$ at a step 428, followed by terminating the present program. The second predetermined leaning value $X_{VT}$ is set, e.g. in relation to the engine rotational speed Ne as shown in FIG. 6.

If the answer to the question of the step 424 is affirmative (Yes), i.e. if the condition of selecting the high speed valve timing is satified, the high speed valve timing is selected at a step 429, and then it is determined at a step 430 whether or not the high speed valve timing was selected in the last loop. If the answer to this question is affirmative (Yes), the program proceeds to the step 431, whereas if the answer is negative (No), the program proceeds to the step 427.

The above steps 424 to 431 carry out selection of the normal valve timing, i.e. the valve timing enabling to obtain a larger engine output is selected. However, when the valve timing is changed over after completion of the traction control, the air/fuel ration is leaned by setting $K_{TCS}$ to $X_{VT}$ until the third predetermined time period $t_{AF}$ elapses. Thus, when the valve timing is changed to the valve timing enabling to obtain a larger engine output after completion of the traction control during which the valve timing enabling to obtain a smaller engine output is selected, the rate of increase in the engine output caused by the changeover of the valve timing is made smaller by leaning of the air/fuel ratio to thereby enable to prevent a sudden increase in the engine output and hence improve the driveability.

In this embodiment of the invention, the $K_{TCS}$ is set to the value $X_{VT}$ before the third predetermined time period $t_{AF}$ elapses and to 1.0 after the lapse of the time period $t_{AF}$. Alternatively, the coefficient $K_{TCS}$ may be gradually decreased from the value $X_{VT}$ to 1.0 with the lapse of time. Further, instead of setting the leaning coefficient $K_{TCS}$ to the second predetermined leaning value $X_{VT}$, the timing of ignition may be retarded to thereby prevent a sudden increase in the engine output.

In this embodiment, the traction control is carried out by leaning the air/fuel ratio of a mixture supplied to the engine and cutting off the supply of fuel to the engine. However, this is not limitative, and the traction control may be carried out by narrowing the throttle value opening or by some other means. In such a case, as a parameter indicating load on the engine, the position of the accelerator pedal is preferably used rather than the intake pipe absolute pressure $P_{BA}$.

FIGS. 7 to 10 show a second embodiment of the invention.

Figure 7B:
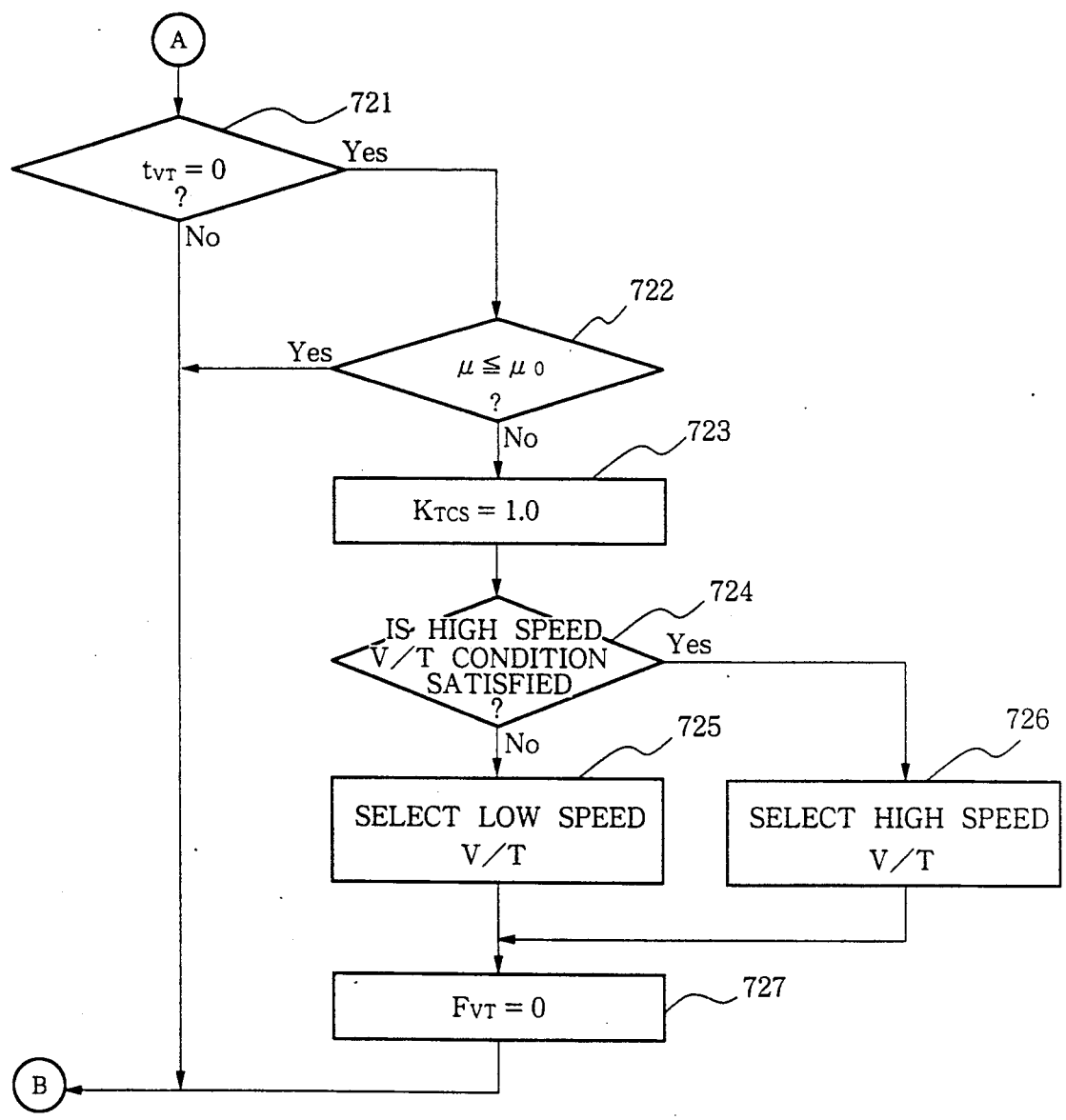
FIG. 7 comprised of FIG. 7A and FIG. 7B, is a flowchart showing a program for carrying out the driving wheel slip control and the valve lift characteristic-changing control according to a second embodiment of the invention.

FIG. 7 shows a program for carrying out the traction control and the valve timing control, which is similar to that of FIG. 4. This program is different from that of FIG. 4 in the following points:

In place of determining whether or not the $\mu$ of the road surface is equal to or lower than the predetermined value $\mu_0$ upon selecting the opposite valve timing, it is determined whether or not the reference yaw rate $Y_{REF}$ and the yaw rate difference $\Delta Y$ are equal to or higher than the respective predetermined values $G_1^-$ and $\Delta G_2$ to thereby prevent degradation of controllabililty of the vehicle during turning thereof.

Figure 8:
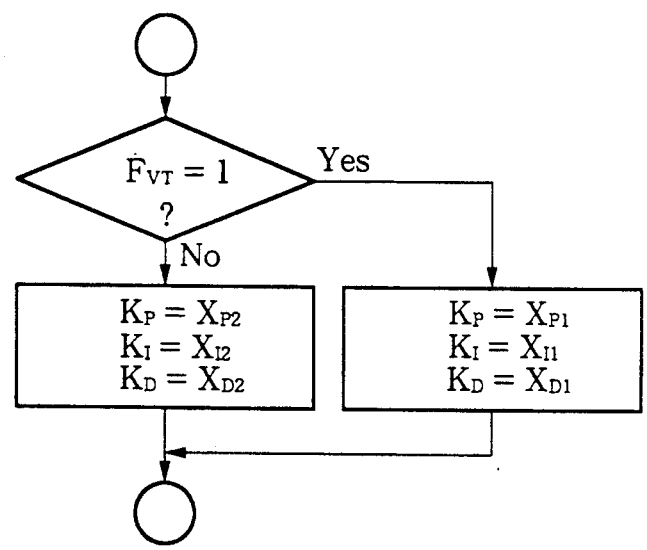
FIG. 8 is a flowchart showing a subroutine for determining PID control gains of a slip signal.

Further, a flag FLG indicating whether or not the opposite valve timing is selected is provided to use it in a subroutine shown in FIG. 8 for determining the control gains for PID control.

Therefore, in the following, description of the corresponding identical steps is omitted and only steps of the second embodiment different from corresponding steps of the first embodiment will be described.

At a step 705, it is determined whether or not the reference yaw rate $Y_{REF}$ calculated by the TCS-ECU is equal to or higher than a predetermined value $G_1^+$. If the answer to this question is affirmative (Yes), i.e. if $Y_{REF} \geq G_1^+$, a $t_{OFF}$ timer referred to hereinafter is set to a first predetermined time period $t_{OFF}$, and started at a step 712, followed by terminating the present program.

If the answer to the question of the step 705 is negative (No), i.e. if $Y_{REF} < G_1^+$, it is determined at a step 706 whether or not the yaw rate difference $\Delta Y$ calculated by the TCS-ECU 20 is equal to or higher than a predetermined value $\Delta G_2$. If the answer to this question is affirmative (Yes), i.e. if $\Delta Y \geq \Delta G_2$, the program proceeds to the step 712, whereas if the answer is negative (No), i.e. if $\Delta Y < \Delta G_2$, it is determined at a step 707 whether or not the engine rotational speed Ne is equal to or lower than a first predetermined engine rotational speed $N_1$ (e.g. 2,000 rpm). If the answer to this question is affirmative (Yes), i.e. if $Ne \leq N_1$, the high speed valve timing is selected at a step 710, a flag $F_{VT}$ is set to 1 at a step 711, and then the program proceeds to the step 712.

As stated above, at the steps 707 and 710, the high speed valve timing is selected in a low engine rotational speed region in which Ne≦N1 is satisfied, i.e. a valve timing (hereinafter referred to as "opposite valve timing") is selected which is opposite to a normal one and at which a smaller engine output is obtained. Thus, the engine output is decreased to thereby decrease the magnitude of excessive slip of the driving wheel(s). The flag $F_{VT}$ is set to 1 in order to indicate the selection of the opposite valve timing, and the flag $F_{VT}$ is used in a subroutine of FIG. 8 referred to hereinafter.

If the answer to the question of the step 707 is negative (No), i.e. if Ne>N1, it is determined at a step 708 whether or not the engine rotational speed Ne is equal to or higher than a second engine rotational speed N2 (e.g. 5,000 rpm) which is longer than the first engine rotational speed N1. If both the answers to the questions of the steps 707 and 708 are negative (No), i.e. if N1<Ne<N2, the program jumps to the step 712, whereas if the answer to the question of the step 708 is affirmative (Yes), i.e. if Ne≧N2, the low speed valve timing is selected at a step 709, and then the program proceeds to the step 711. At the steps 708 and 709, the low speed valve timing is selected in a high engine rotational speed region in which Ne≧N2 is satisfied, i.e. the opposite valve timing is selected.

If it is determined at the steps 705 and 706 that $Y_{REF} \geq G_1^+$ or $\Delta Y \geq \Delta G_2$, the valve timing is not changed over but held as it was selected in the last loop. If the driver of the vehicle turns the steering wheel to an extent greater than a predetermined value (i.e. $Y_{REF} \geq G_1^+$ is satisfied) to turn the vehicle, or if a difference between a turning movement of the vehicle intended by the driver and an actual movement of same is larger than the predetermined value (i.e. $\Delta Y \geq \Delta G_2$ is satisifed; e.g. in the case where the advancing direction of the vehicle is shifted due to a side wind), the changeover of the valve timing can result in a drastic change in the engine output, and even a change in the distribution of wheel load, to thereby degrade the controllability of the vehicle. Therefore, if $Y_{REF} \geq G_1^+$ or $\Delta Y \geq \Delta G_2$ is satisfied, the valve timing is not changed over to thereby prevent degraded controllability of the vehicle. Further, the valve timing is not changed over in an engine rotational speed region of $N_1 < Ne < N_2$ determined by the steps 707 and 708 to thereby provide a hysteresis for the changeover of the valve timing so that the frequency of the changeover of the valve timing is inhibited from increasing by preventing the valve timing from being changed over due to a slight variation in the engine rotational speed. This prolongs the life of the connection-changeover mechanism 39.

In this embodiment, if the answer to the question of the step 721 is negative (No), i.e. if $t_{VT}>0$, the program is terminated.

If the answer to the question of the step 721 is affirmative (Yes), i.e. if $t_{VT}=0$, it is determined at a step 722 whether or not the μ of the road surface is equal to or lower than a predetermined value $\mu_0$. If the answer to this question is affirmative (Yes), i.e. if $\mu \leq \mu_0$, which means that the road surface is slippery, the program is terminated to hold the valve timing of the last loop without proceeding to the steps 723 et seq where the valve timing is changed over.

Thus, it is possible to prevent hunting resulting from occurrence of an excessive slip state of the driving wheel(s) which is triggered by changeover of the valve timing when the vehicle is on a slippery road surface, whereby the controllability of the vehicle can be improved and the frequency of changeover of the valve timing can be decreased to thereby prolong the life of the connection-changeover mechanism 39.

If the answer to the question of the step 722 is negative (No), i.e. if $\mu > \mu_0$, the leaning coefficient $K_{TCS}$ is set to a value of 1.0 (non-correction value) at a step 723, and it is determined at a step 724 whether or not a condition that the high speed valve timing should be selected is satisfied. This determination is carried out e.g. based upon the engine rotational speed Ne, the intake pipe absolute pressure $P_{BA}$, the engine coolant temperature $T_W$, etc. to thereby select value timing enabling to obtain a larger engine output.

If the answer to the question of the step 724 is negative (No), i.e. if the condition of selecting the high speed valve timing is not satisfied, the low speed valve timing is selected at a step 725, whereas if the answer is affirmative (Yes), the high speed valve timing is selected at a step 726. By the steps 724 to 726, normal valve timing (at which a larger engine output is obtained) is selected, and the flag $F_{VT}$ is set to 0 to indicate this selection at a step 727, followed by terminating the present program.

FIG. 8 shows a subroutine for determining the control gains $K_P$, $K_I$, and $K_D$ for the PID control used for calculation of the slip signal S by the TCS-ECU 20. This subroutine is executed following the execution of the program of FIG. 7.

If the flag $F_{VT}$ assumes a value of 1, the control gains $K_P$, $K_I$, and $K_D$ are set to respective first control values $X_{P1}$, $X_{I1}$ and $X_{D1}$, whereas if the flag $F_{VT}$ assumes a value of 0, they are set to respective second control values $X_{P2}$, $X_{I2}$, and $X_{D2}$. Thus, the different values of the control gains $K_P$, $K_I$, and $K_D$ are selected depending on whether the normal valve timing is selected ($F_{VT}=0$) or the opposite valve timing is selected ($F_{VT}=1$), to thereby set the control gains to values suitable for an increase rate of engine output caused by the selected valve timing. This makes it possible to obtain a value of the slip signal S indicating the slip state of the driving wheel(s), which is suitably adjusted for the driving wheel slip control by taking into consideration time lag in the control system. Thus, the driving wheel slip control suitable for the selected valve timing becomes possible.

Figure 9A:
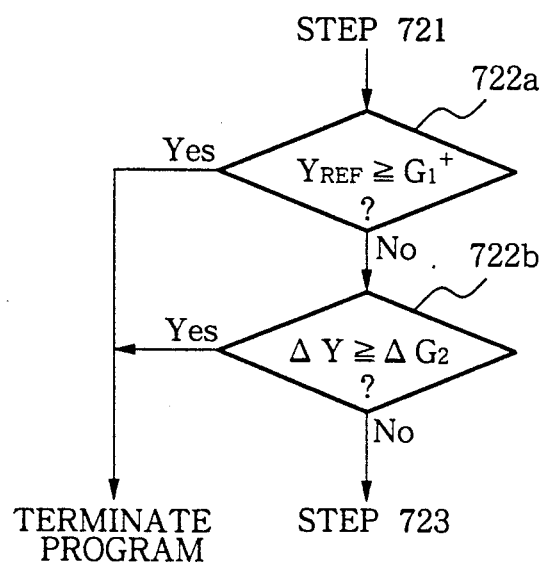
FIG. 9a is a fragmentary flowchart showing a variation of the program of FIG. 7.
Figure 9B:
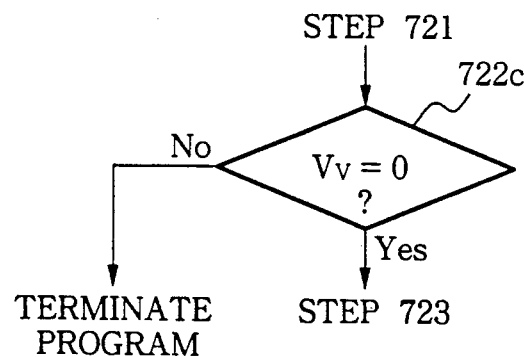
FIG. 9b is a fragmentary flowchart showing another variation of the program of FIG. 7.
Figure 10:
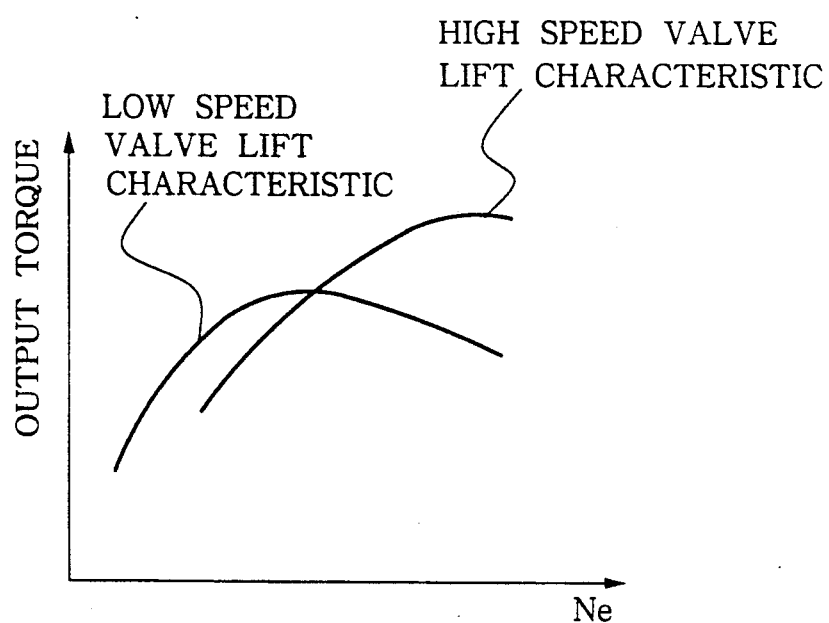
FIG. 10 is a graph showing variations in the engine output torque relative to the engine rotational speed, plotted with respect to the low speed and high speed valve lift characteristics.

FIGS. 9a and 9b show variations of the embodiment of the invention shown in FIG. 7. These variations are different from the program of FIG. 7 in that the step 722 of FIG. 7 is replaced by steps 722a and 722b, or by a step 722c.

In the variation of FIG. 9a, similarly to the steps 705 and 706 of FIG. 7, it is determined at a step 722a whether or not the reference yaw rate $Y_{REF}$ is equal to or higher than the predetermined yaw rate $G_1^+$, and at a step 722b whether or not the yaw rate difference $\Delta Y$ is equal to or higher than the predetermined yaw rate difference $\Delta G_2$. If both answers to the questions of the steps 722a and 722b are negative (No), i.e. if $Y_{REF} < G_1^+$ and $\Delta Y < \Delta G_2$, the program proceeds to the step 723 in FIG. 7, whereas if at least one of the answers is affirmative (Yes), i.e. if $Y_{REF} \geq G_1^+$ or $\Delta Y \geq \Delta G_2$, the present program is terminated. According to this variation, in view of the fact that if the driver of the vehicle turns the steering wheel to an extent larger than a predetermined value or if the difference between a turning movement of the vehicle intended by the driver and an actual movement thereof is larger than a predetermined value, the changeover of the valve timing can cause not only an excessive slip state of the driving wheel(s) but also a sudden change in the distribution of the wheel load to thereby degrade the controllability of turning movement of the vehicle, the changeover of valve timing on such an occasion is inhibited to prevent the above-mentioned inconveniences.

In the variation of FIG. 9b, it is determined at a step 922c whether or not the vehicle speed $V_V$ is equal to 0. If the answer to this question is affirmative (Yes), the program proceeds to the step 723 in FIG. 7, whereas if the answer is negative (No), the present program is terminated. According to this variation, the changeover of the valve timing is not carried out until the vehicle stops, to thereby avoid the possibility of changeover of the valve timing causing an excessive slip rate of the driving wheel(s) again.

In the first embodiment described above, in place of the comparison of the reference yaw rate $Y_{REF}$ with the predetermined value $G_1{}^+$ at the step 705, it may be determined whether or not the actual yaw rate Yaw is above a predetermined value.

In the above-described embodiment, the traction control is carried out by leaning the air/fuel ratio of a mixture supplied to the engine. However, this is not limitative. For example, the traction control may be carried out by decreasing the throttle valve opening.

What is claimed is:

1. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means for changing the valve lift characteristic of said at least one set of said set of inlet valves and said set of exhaust valves when said excessive slip state of said at least one of is detected, the improvement comprising:
valve lift characteristic-restoring means responsive to an output from said driving wheel slip-detecting means for storing the valve lift characteristic changed by said valve lift characteristic-changing means to one before the change, when said excessive slip state of said at least one of said driving wheels has been eliminated;
vehicular running condition-detecting means for detecting a specific running condition of said automotive vehicle; and
inhibiting mean responsive to an output from said vehicular running condition-detecting means for inhibiting restoring operation by said valve lift characteristic-restoring means when said vehicular running condition-detecting means detects said specific running condition of said automotive vehicle.

2. A valve control system according to claim 1, wherein said vehicular running condition-detecting means comprises vehicle speed-detecting means, said specific running condition of said automotive vehicle being a condition that the speed of said automotive vehicle is not equal to zero.

3. A valve control system according to claim 1, wherein said vehicular running condition-detecting means comprises road surface friction coefficient-detecting means for detecting a friction coefficient of a road surface on which said automotive vehicle is running, said specific running condition of said automotive vehicle being a condition that said friction coefficient of said road surface detected is not higher than a predetermined value.

4. A valve control system according to claim 3, wherein when said friction coefficient is not higher than said predetermined value, the valve lift characteristic is held at one enabling to obtain a larger engine output when said engine is in a lower engine rotational speed region.

5. In a valve control system for controlling the valve lift characteristic of at least one set of a set of inlet valves and a set of exhaust valves of an internal combustion engine installed in an automotive vehicle having driving wheels, including driving wheel slip-detecting means for detecting an excessive slip state of at least one of said driving wheels, and valve lift characteristic-changing means for changing the valve lift characteristic of said at least one set of said set of inlet valves and said set of exhaust valves when said excessive slip state of said at least one of said driving wheels is detected, the improvement comprising:
turning-detecting means for detecting turning of said automotive vehicle; and
inhibiting means for inhibiting changing operation by said valve lift characteristic-changing means when said turning-detecting means detects turning of said automotive vehicle.

6. A valve control system according to claim 5, wherein said turning-detecting means comprises yaw rate-detecting means for detecting a yaw rate of said automotive vehicle.

7. A valve control system according to claim 5, wherein said turning-detecting means comprises reference yaw rate-calculating means for calculating a predetermined reference yaw rate of said automotive vehicle.

8. A valve control system according to claim 5, wherein said turning-detecting means comprises yaw rate-detecting means for detecting a yaw rate of said automotive vehicle, reference yaw rate-calculating means for calculating a predetermined reference yaw rate of said automotive vehicle, and difference-calculating means for calculating a difference between said yaw rate detected and said predetermined reference yaw rate calculated.

9. In a system for controlling slip of driving wheels of an automotive vehicle in which is installed an internal combustion engine having a set of inlet valves and a set of exhaust valves, including driving wheel speed-detecting means for detecting the speed of at least one of said driving wheels of said automotive vehicle, vehicle speed-detecting means for detecting the speed of said automotive vehicle, difference-calculating means for calculating a difference between an output from said driving wheel speed-detecting means and an output from said vehicle speed-detecting means, feedback control amount-calculating means for calculating a feedback control amount based upon an output from said difference-calculating means and at least one predetermined gain, and driving wheel torque-reducing means responsive to an output from said feedback control amount-calculating means for reducing output torque of said driving wheels, the improvement comprising:
valve lift characteristic-changing means for changing the valve lift characteristic of at least one set of said sets of inlet and exhaust valves when said output from said feedback control amount-calculating means indicates an excessive slip state of at least one of said driving wheels; and gain-changing means for changing the value of said at least one predetermined gain used by said feedback control amount-calculating means, when the valve lift characteristic is changed by said valve lift characteristic-changing means.

10. A valve control system for controlling the valve lift characteristic of at least one set of a set of inlet valves and a set of exhaust valves of an internal combustion engine installed in an automotive vehicle having driving wheels, comprising:

valve lift characteristic-changing means for changing the valve lift characteristic of said at least one set of said set of inlet valves and said set of exhaust valves in a predetermined valve lift characteristic-changing control manner;

road surface condition-detecting means for detecting a condition of a road surface on which said automotive vehicle is running; and control manner-changing means responsive to an output from said road surface condition-detecting means for changing said predetermined valve lift characteristic-changing control manner.

11. A valve control system according to claim 10, wherein said road surface condition-detecting means comprises means for detecting a friction coefficient of said road surface, said control manner-changing means operating to decrease frequency of changing of the valve lift characteristic, when said friction coefficient detected is not higher than a predetermined value.

12. A valve control system for controlling the valve lift characteristic of at least one set of a set of inlet valves and a set of exhaust valves of an internal combustion engine installed in an automotive vehicle having driving wheels, comprising:

valve lift characteristic-changing means for changing the valve lift characteristic of said at least one set of said set of inlet valves and said set of exhaust valves in a predetermined valve lift characteristic-changing control manner;

turning-detecting means for detecting turning of said automotive vehicle; and control manner-changing means for changing said predetermined valve lift-changing control manner, when said turning-detecting means detects turning of said automotive vehicle.

13. A valve control system according to claim 12, wherein said control manner-changing means operates to inhibit changing of the valve lift characteristic, when said turning-detecting means detects turning of said automotive vehicle.

* * * * *